US006518984B1

(12) United States Patent
Maeckel et al.

(10) Patent No.: US 6,518,984 B1
(45) Date of Patent: *Feb. 11, 2003

(54) RECORD RANGE CONTROL FOR BROWSING PUBLISHED DATABASES

(75) Inventors: Clay A. Maeckel, San Jose, CA (US); Kathleen R. Watson, Los Gatos, CA (US)

(73) Assignee: Apple Computer, Inc., Cupertino, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/140,251

(22) Filed: Aug. 26, 1998

(51) Int. Cl.⁷ .................................. G09G 5/00
(52) U.S. Cl. ........................ 345/786; 707/4; 345/784
(58) Field of Search ................... 345/339, 341, 345/973, 974, 784–787, 968; 707/3–5, 10

(56) References Cited

U.S. PATENT DOCUMENTS

| 5,263,137 A | | 11/1993 | Paal et al. | 345/342 |
| 5,265,246 A | * | 11/1993 | Li et al. | 345/341 |
| 5,333,247 A | * | 7/1994 | Gest et al. | 345/438 |
| 5,418,549 A | * | 5/1995 | Anderson et al. | 345/145 |
| 5,553,225 A | * | 9/1996 | Perry | 707/4 |
| 5,655,094 A | * | 8/1997 | Cline et al. | |
| 6,157,381 A | * | 12/2000 | Bates et al. | 345/786 |
| 6,268,854 B1 | * | 7/2001 | Borden et al. | 345/786 |

OTHER PUBLICATIONS

Claris Corporation "FileMaker Pro User's Guide" (1992).*
Galitz, W. O. ("The Essential Guide to User Interface Design", 1997).*
MicroSoft ("Getting Results with Microsoft Office '97", 1997).*
Getting Results with Microsoft Office 97 # 2 (pp. 107 and 498, Microsoft, 1997).*
"FileMaker Pro 4.0 User's Guide", Chapter 11: Publishing Files on the Web, pp. 11–1 to 11–28, 1997.

* cited by examiner

Primary Examiner—Sy D. Luu

(57) ABSTRACT

Improved graphical user interfaces and techniques for requesting records from a shared database over a network are disclosed. One aspect pertains to a record range control that allows easy selection of a record range to be viewed. Another aspect pertains to a record range control that provides a graphical depiction of the record range to be viewed. In one embodiment, the record range control includes a background grid representing a complete set of records within a database, and a slider bar that slides over the background grid. The position of the slider bar with respect to the background grid identifies those records of the complete set of records to be retrieved or displayed.

25 Claims, 19 Drawing Sheets

RECORD RANGE CONTROL FOR BROWSING PUBLISHED DATABASES

BACKGROUND OF THE INVENTION

1. Field of the Invention

The present invention relates to databases and, more particularly, to shared databases over networks.

2. Description of the Related Art

Conventionally, databases contain a large amount of data and require specialized database applications to view or access the data. These specialized database applications include, for example, Microsoft Access by Microsoft Corporation or FileMaker Pro by Filemaker, Inc.

Databases have sometimes been made available through a network such as a Local Area Network (LAN), Wide Area Network (WAN), intranet, or Internet. Such databases can be referred to as shared databases. A user of a shared database will want to either browse through the database or enter a query and then review the results of the query (i.e., a view of the database). A query is made through a network to the database by a requestor. In response to the query, the database can return to the requestor those records of the database that satisfy the query.

General browsing of an entire database is problematic because the size of the databases are often large. Even when a query is entered, the number of records that satisfy the query is also often large. Various problems occur when a large number of records are involved. One problem is that a long period of time is needed to transmit over the network all the records that are either contained in the database or satisfy a query. The transmission of such large amounts of data also leads to network congestion.

With the Internet, which is particularly congested and suffers from bandwidth constraints, some attempts have been made to send only a portion of the records that satisfy a query to a requester. This significantly reduces the transmission time and bandwidth requirement. For example, in the case where the network is the Internet and the results of a particular query yields one-hundred (100) records, then the first twenty (20) records can be initially transmitted over the Internet to the requestor. Thereafter, if the requester is interested in viewing any of the other records, these other records can be requested and supplied to the requestor in subsequent sets of twenty (20) records. With this approach, the record sets are sequential sets without the ability for the user to specify a particular range of the records. Typically, the requestor is permitted to select a next set of records or a previous set of records, where the set is a predetermined maximum number of records (e.g., 20). Accordingly, with conventional approaches, specific record ranges of a database were not able to be set by a requester.

Another problem is that the user wishing to browse or to scan through records in the database, or a view of the database, is unable to easily traverse between different record ranges of the database. There is also nothing to graphically indicate to the user which portion of the database the user is currently viewing.

Accordingly, there is a need for improved ways to interact with a database over a network such that record ranges can be easily selected by a user and that a portion of a database being viewed can be graphically depicted.

SUMMARY OF THE INVENTION

Broadly speaking, the invention relates to graphical user interfaces and techniques for requesting records from a shared database over a network. One aspect of the invention pertains to a record range control that allows easy selection of a record range to be viewed. Another aspect of the invention is a record range control that provides a graphical depiction of the record range to be viewed.

The invention can be implemented in numerous ways, including as a method, an apparatus, a computer readable medium, and a computer system. Several embodiments of the invention are discussed below.

As a graphical user interface for a display screen of a computer system, an embodiment of the invention includes a background grid representing a complete set of records within a database; and a slider bar that slides over the background grid. The position of the slider bar with respect to the background grid identifies those records of the complete set of records to be retrieved or displayed.

As a computer-implemented method for displaying a visual indication of a position within a database having records, an embodiment of the invention includes: determining a record range within the database to view; and displaying a record range indicator on a display screen of a computer system. The record range indicator graphically illustrates the relative position of the determined record range within the database to be viewed.

As a method for requesting over a network a range of records of a database, where the database is stored in a first computer coupled to the network, an embodiment of the method includes: displaying a record range control on a display screen of a second computer system coupleable to the network, the record range control includes a background grid representing a complete set of records within the database, and a slider bar that slides over the background grid; dragging the slider bar with respect to the background grid to graphically select those records of the complete set of records to be retrieved; determining a selected record range based on the position of the slider bar with respect to the background grid following the dragging; and forming a request for the records within the database stored on the first computer using the selected record range.

As a computer readable medium containing computer program code for displaying a visual indication of a position within a database having records, an embodiment of the invention includes: computer program code that determines a record range within the database to view; and computer program code that displays a record range indicator on a display screen of a computer system, the record range indicator graphically illustrating the relative position of the determined record range within the database to be viewed.

As a computer readable medium containing computer code for requesting over a network a range of records of a database, the database being stored in a first computer coupled to the network, another embodiment of the invention includes: computer program code for displaying a record range control on a display screen of a second computer that is coupleable to the network, the record range control includes a background grid representing a complete set of records within the database, and a slider bar that slides over the background grid; computer program code for dragging the slider bar with respect to the background grid to graphically select those records of the complete set of records to be retrieved; computer program code for determining a selected record range based on the position of the slider bar with respect to the background grid following the dragging; and computer program code for forming a request for the records within the database stored on the first computer using the selected record range.

The invention has various advantages depending on the aspects of the invention being implemented. One advantage of the invention is that a graphical control allows a user to request a particular record range in a graphical manner. Another advantage of the invention is that the graphical control is easily manipulated to request particular record ranges. Still another advantage is that the particular record range that is requested is graphically depicted relative to the database as a whole so as to provide visual context as to the portion of the database being viewed. Yet another advantage of the invention is that a user is able to more efficiently browse a database or portion thereof (e.g., search or query results) because only a designated range of the associated records need be downloaded over the network (e.g., Internet) to the user.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to graphical user interfaces and techniques for requesting records from a shared database over a network. One aspect of the invention pertains to a record range control that allows easy selection of a record range to be viewed. Another aspect of the invention is a record range control that provides a graphical depiction of the record range to be viewed.

Embodiments of the invention are discussed below with reference to FIGS. 1–10. However, those skilled in the art will readily appreciate that the detailed description given herein with respect to these figures is for explanatory purposes as the invention extends beyond these limited embodiments.

Figure 1:
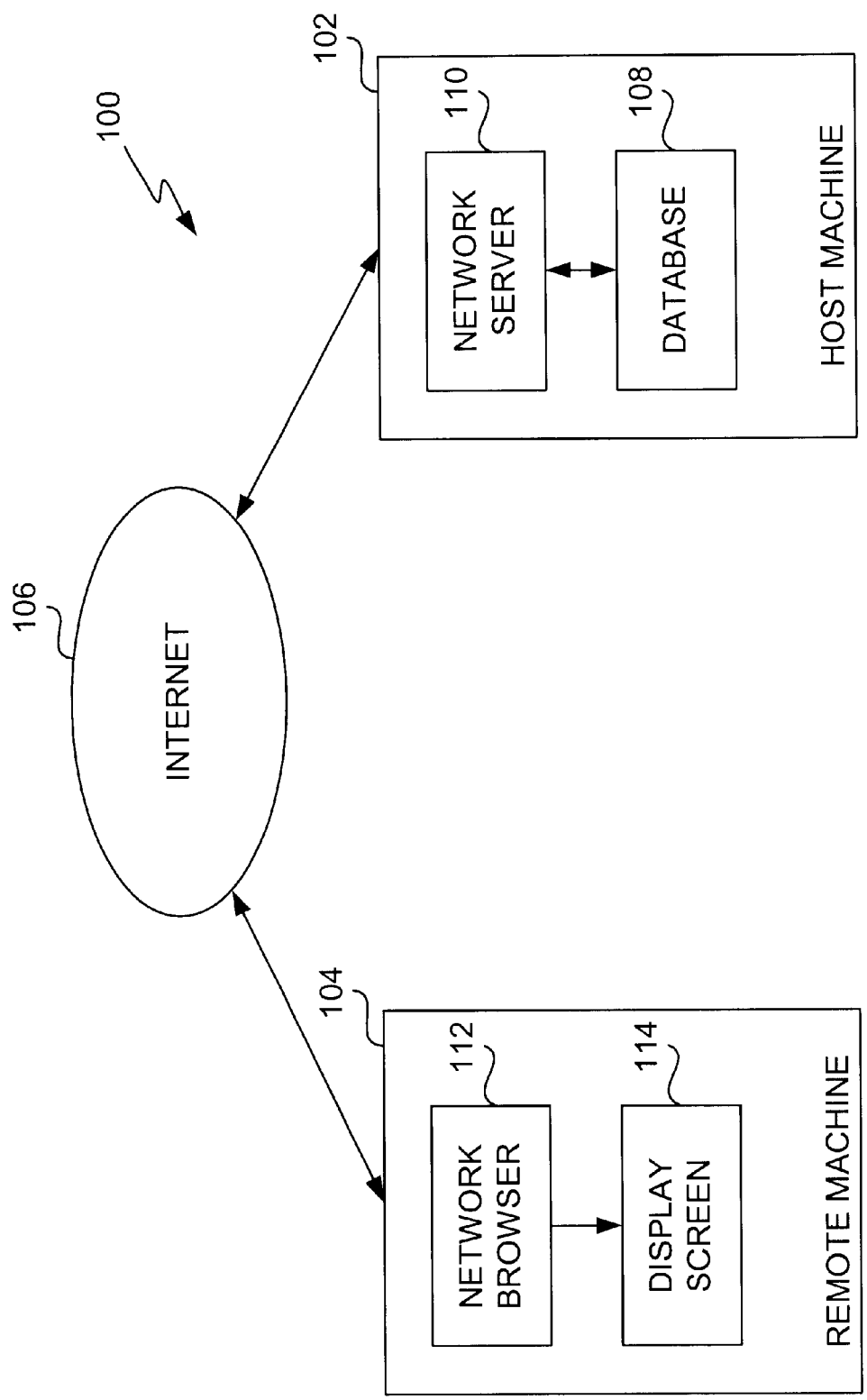
FIG. 1 is a block diagram of a network-enabled database system according to an embodiment of the invention.

FIG. 1 is a block diagram of a network-enabled database system 100 according to an embodiment of the invention. The network-enabled database system 100 includes a host machine 102 and a remote machine 104. The host machine 102 and the remote machine 104 are coupled through the Internet 106 or some other network (e.g., LAN, WAN or intranet).

The host machine 102 includes a database 108 and a network server 110. The network server 110 operates to receive requests from remote machines over the Internet 106 and to service the requests by accessing data stored in the database 108. In this regard, the host machine 102 is a web server in which pages of data retrieved from the database 108 are served to remote machines through the Internet 106.

The remote machine 104 is a representative computer or computing device that couples to the Internet 106. The remote machine 104 is able to make requests to the host machine 102 through the Internet 106 for certain records or data stored in the database 108 of the host machine 102. The remote machine 104 includes a network browser 112 and a display screen 114. The network browser 112 is, for example, an Internet browser application that is utilized to traverse the Internet 106 to "visit" various web sites provided by web servers coupled to the Internet 106. In particular, the network browser 112 can be used to send requests to and receive replies from the host machine 102 via the Internet 106. In this embodiment, the communications (e.g., requests and replies) between the host machine 102 and the Internet 106 as well as the communications between the remote machine 104 and the Internet 106 use, for example, Hyper Text Transfer Protocols (HTTP). Also, in this embodiment, the pages of data provided to the remote machine 104 are Hyper Text Mark-up Language (HTML) pages. Typically, a reply is a page of data supplied from a web server (e.g., the host machine 102) coupled to the Internet 106. Upon receiving the reply, the reply is displayed on the display screen 114 by the network browser 112 so that the user of the remote machine 104 can view the response to their earlier request. Thereafter, a user can interact with the information displayed on the display screen 114 by the network browser 112.

Hence, the network-enabled database system 100 allows a database associated with a web server that is coupled to the Internet 106 to be shared by a large population of potential users by way of the Internet 106. This is often referred to as "publishing" the database on the Internet. Of course, various security measures (e.g., read-only, passwords) can be used to protect the shared database.

According to one embodiment, the network server 110 functions as a Common Gateway Interface (CGI) application that handles interactions between the database 108 and the network browser 112 at the remote machine 104. The database 108 is actually managed by a database program. Hence, a request from the network browser 112 at the remote machine 104 is sent through Internet 106 to the network server 110 of the remote machine 102. The CGI within the network server 110 handles the request by forwarding it to the database program which, in turn, accesses the database 108 to retrieve the desired records. The desired records are then forwarded back to the CGI by the database program and then the CGI forwards the web page including the requested records to the network browser 112 through the Internet 106. Hence, the database program within the host machine 102 acts as a web server by communicating with the network browser 112. Similar to other web server applications, the database program delivers HTML web pages in format files to the network browser 112. The network server supports Get, Post and Put commands (HTTP commands).

Figure 2A:
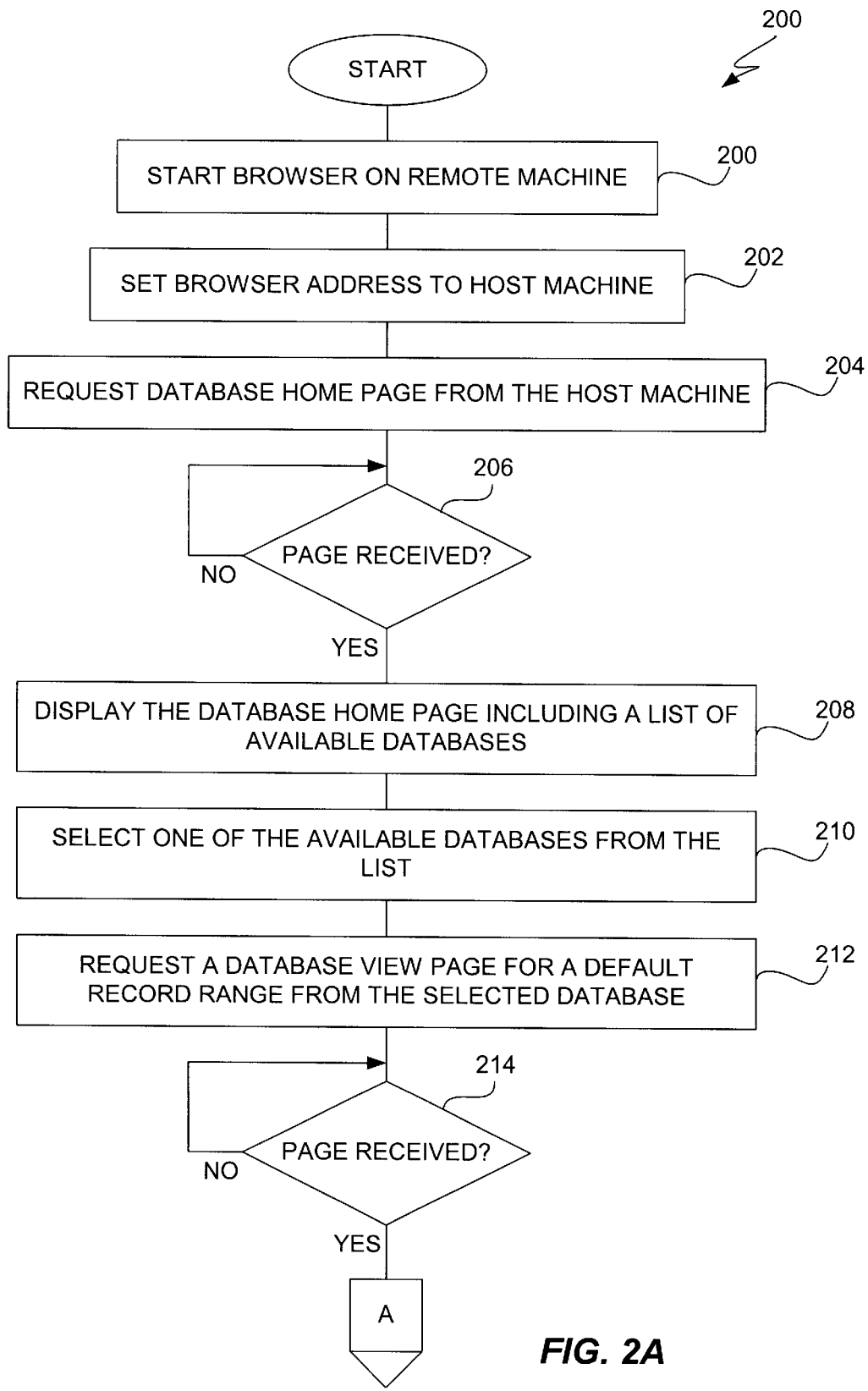
FIGS. 2A and 2B are flow diagrams of remote database view processing according to an embodiment of the invention.
Figure 2B:
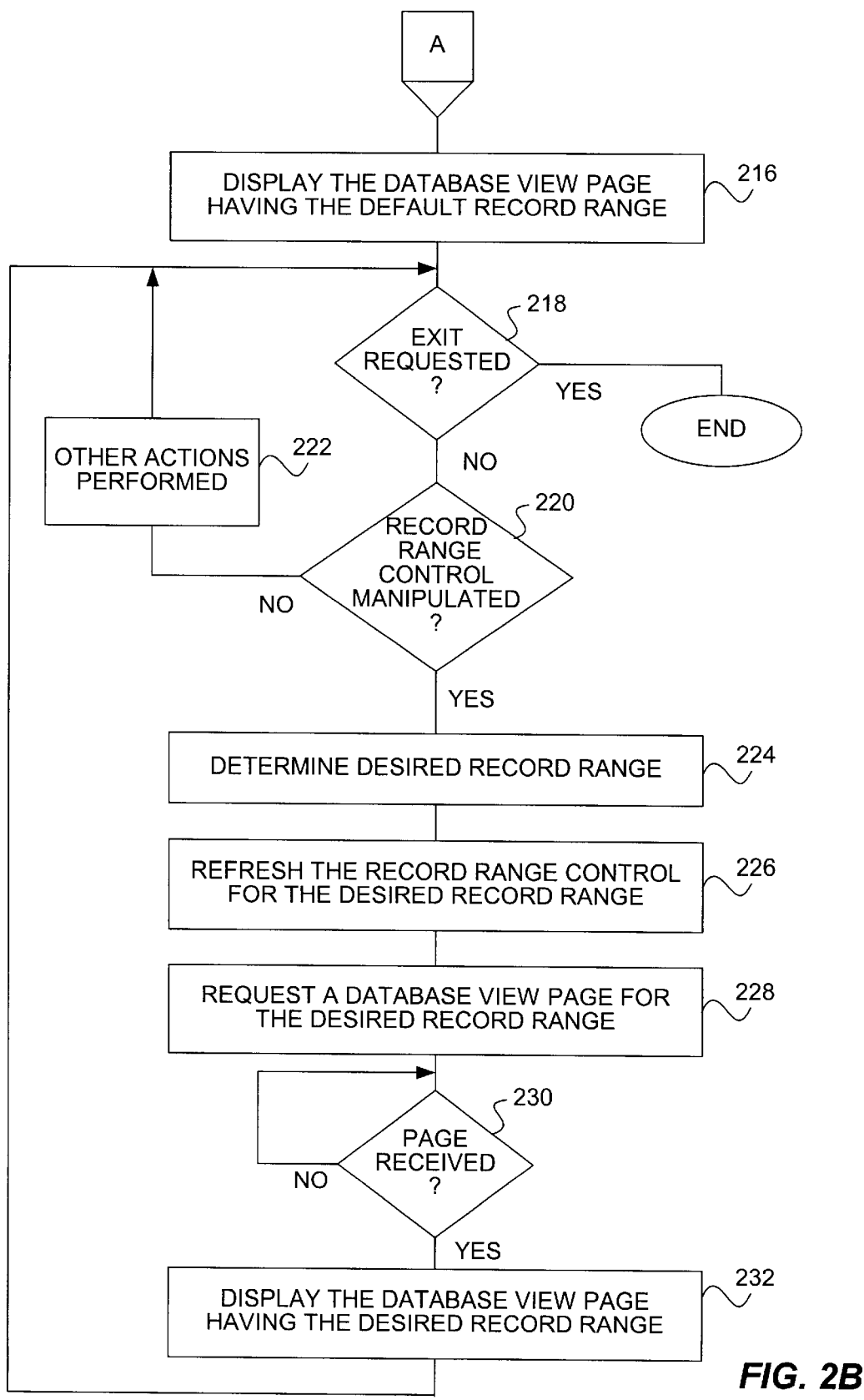

FIGS. 2A and 2B are flow diagrams of remote database view processing 200 according to an embodiment of the invention. The remote database view processing 200, for example, represents the operation of the remote machine 104 illustrated in FIG. 1 as it interacts with the host machine 102 through the Internet 106.

The remote database view processing 200 initially starts 200 a browser (i.e., network browser) on the remote machine. As an example, the browser is an application program such as the commonly known Netscape Navigator from Netscape Communications, Inc. or Microsoft Internet Explorer application programs from Microsoft Corporation. Once the browser is operational, a browser address (IP address) is set 202 to the host machine. By setting the browser address to the host machine, the browser retrieves a page of information from the host machine. Specifically, a database home page is requested 204 from the host machine.

Next, a decision block 206 determines whether the requested page has been received. When the decision block 206 determines that the requested page has not been received, the remote database view processing 200 awaits the arrival of the page. If the page does not arrive within a predetermined period of time, the decision block 206 can abort the waiting for the page to be received. On the other hand, when the decision block 206 determines that the requested page has been received, then the remote database view processing 200 can process the page that has been received. The requested page that has been received is provided to the remote machine by the host machine through the Internet. Here, the requested page is the database home page. At the remote machine, then, the database home page including a list of available databases is displayed 208.

A user of the remote machine is then able to select 210 one of the available databases from the list being displayed. For example, the list of available databases provided within the database home page can be displayed on the display screen such as the display screen 114 of the remote machine 104 illustrated in FIG. 1. A user of the remote machine then selects one of the available databases from the list.

Next, a database view page for a default record range from the selected database is requested 212. Here, the remote machine is making a request through the Internet to the host machine to provide the remote machine with a view of the database. The particular view of the database in this case is for a default record range. As an example, with respect to FIG. 1, the remote machine 104 requests the host machine 102 to provide it with a view of the database 108 in accordance with a default record range, such as, records 1–5. Upon receiving the request, the host machine retrieves the requested records from the database and then provides the records to the remote machine in the form of a web page, known as the database view page.

Following block 212, a decision block 214 determines whether the requested page has been received. Here, after making the request, the remote machine is waiting for the host machine to return the requested database view page. When the decision block 214 determines that the requested page has not been received, then the remote database view processing 200 awaits the reception of the page. If a predetermined period of time has elapsed since the request for the database view page was made, then the remote database view processing 200 can elect to abort the request and return an error condition. On the other hand, when the decision block 214 determines that the requested page has been received, then the database view page having the default record range is displayed 216. For example, with respect to FIG. 1, after the network browser 112 receives the database view page, the database view page is displayed on the display screen 114 by the network browser 112.

Once the database view page is displayed, a user of the remote machine is able to interact with the remote machine to modify the database on the host machine. The modification to the database can, for example, include editing, adding or deleting records to the database. Additionally, a user of the remote machine can also interact with the network browser (e.g., via the display screen) to make additional requests for different database view pages so as to view other portions of the database. Such viewing of portions of a database is often referred to as browsing the database.

In the case where the user desires to browse the database, the user will normally desire to view other records in the database other than those, if any, presently being viewed by the user. Then, eventually the user will desire to end the browsing session. The remote database view processing 200 provides improved browsing of the remote database as follows.

Following block 216, a decision block 218 determines whether exit has been requested. Here, the user is given the opportunity to end the browsing session of the database. If the user signals the browser to quit or leave the web site for the host machine, then the user requests to exit the processing. Hence, in this case, the remote database view processing 200 is complete and ends.

On the other hand, when the user of the remote machine does not request to exit, then the remote database view processing 200 determines 220 whether a record range control has been manipulated. The manipulation of the record range control signals the network browser that the user of a remote machine desires to view other portions of the database.

When the decision block 220 determines that the record range control has not been manipulated, then other actions can be performed 222. These other actions are, for example, adding records, editing records or deleting records of the database. The other actions can also include searching the database and viewing different arrangements of the database. Following block 222, the remote database view processing 200 returns to repeat the decision block 218 and subsequent blocks to await additional user input.

Alternatively, when the decision block 220 determines that the record range control has been manipulated, then the remote database view processing 200 operates to present the remote machine with an updated view of the database which has been requested by the manipulation of the record range control. Specifically, after the record range control has been manipulated, a desired record range is determined 224. Here, the desired record range is determined based upon how the record range control was manipulated. Next, the record range control is refreshed 226 for the desired record range. Here, the display of the record range control is refreshed or updated to correspond to the desired record range. Once refreshed, the record range control indicates the record range that the user is requesting to view. A request 228 for a database view page for the desired record range is then made.

As an example, the network browser 112 sends the request to the network server 110 via the Internet 106. The network server 110 then retrieves the information requested corresponding to the desired record range from the database 108 in the host machine 102 and returns the information requested to the network browser 112 via the Internet 106.

A decision block 230 then determines whether a page has been received. Here, the network browser has made a request and is now awaiting the receipt of the response (e.g., requested page). The decision block 230 causes the remote database view processing 200 to await the reception of the requested page. Once the decision block 230 determines that the requested page has been received, then the database view page having the desired record range is displayed 232. For example, with respect to FIG. 1, the database view page having the desired record range is displayed on the display screen 114 by the network browser 112. Following block 232, the remote database view processing 200 returns to repeat the decision block 218 and subsequent blocks.

Figure 3:
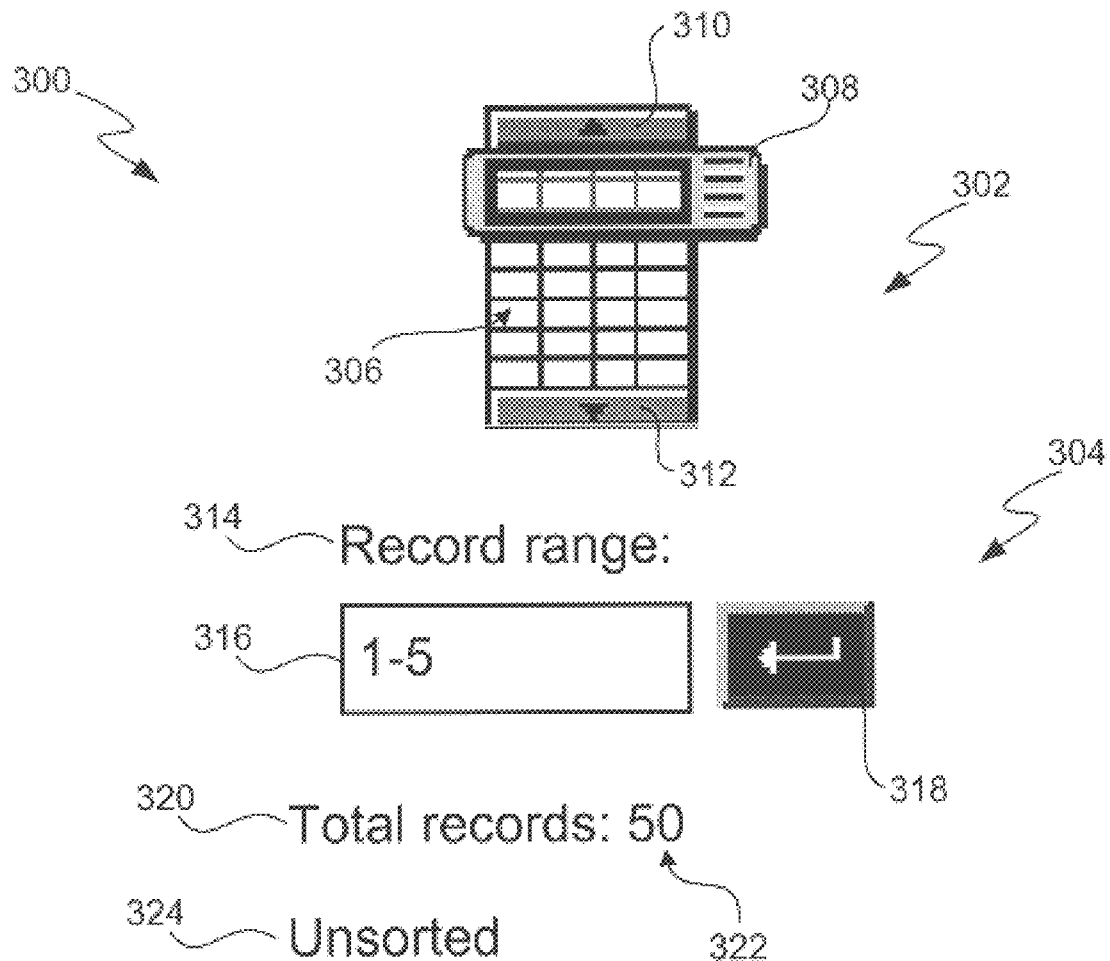
FIG. 3 is a diagram of a record range control according to one embodiment of the invention.

FIG. 3 is a diagram of a record range control 300 according to one embodiment of the invention. The record range control 300 includes a graphical portion 302 and a text portion 304. As illustrated in FIG. 3, in this embodiment, the graphical portion 302 appears above the text portion 304. However, it should be recognized that the orientation of the graphical portion 302 and the text portion 304 can vary in other embodiments.

The graphical portion 302 includes a background grid 306 that represents the entire database of records. A slider control 308 is used to represent or enclose those of the records of the database that are actually being provided to the user in the database view page. The slider control 308 is also movable with respect to the background grid 306. Hence, by moving the slider control 308, a user can control which of records of the database are to be provided to the user in the database view page. Optionally, the height of the slider control 308 can represent the relative proportion of the range of records that are being viewed in the database view page as compared to the entire database.

The graphical portion 302 also includes an up-control 310 and a down control 312. The up-control 310 if clicked on by a user, triggers an event in which the slider control 308 is moved up by one batch of records. Similarly, when the down-control 312 is clicked on, the slider control 308 would move downward by one batch of records. The batch of records has a size that is associated with the record range. In one embodiment, the size of the batch can equal the range of records that are being viewed in the database view page. For example, with respect to FIG. 3, the record range being provided to the user is records 1–5. Hence, should a user click on the down-control 312, the slider control 308 would slide downward with respect to the background grid 306 and cause a new database view page to be provided to the user. The new database view page would include records within the range of 6–10.

The text portion 304 of the record range control 300 includes a record range label 314, a record range text box 316, a record range enter button 318, a total records label 320, a total records amount 322, and a sorted/unsorted indicator 324. The record range label 314 and the total records label 320 provide labels for the record range text box 316 and the total records number 322, respectively. A user is able to specify a new record range within the record range text box 316, and then cause the new record range to be requested and utilized by clicking on the record range enter button 318. The use of the record range text box 316 and the record range enter button 318 will also cause the new record range provided in the database view page from the database to reflect a new record range. Further, when the record range is changed using the record range text box 316 and the record range enter button 318, the slider control 308 is also updated (e.g., moved) to reflect the new record range. The total records number 322 represents the total number of records associated with the database that is being represented by the record range control 300. In the example illustrated in FIG. 3, the database represented by the record range control 300 includes a total of 50 records, with the current record range being records 1–5. The sorted/unsorted indicator 324 indicates whether or not the records of the database associated with the record range control 300 are sorted. In the example illustrated in FIG. 3, the sorted/unsorted indicator 324 indicates that the records of the database are unsorted.

Figure 4:
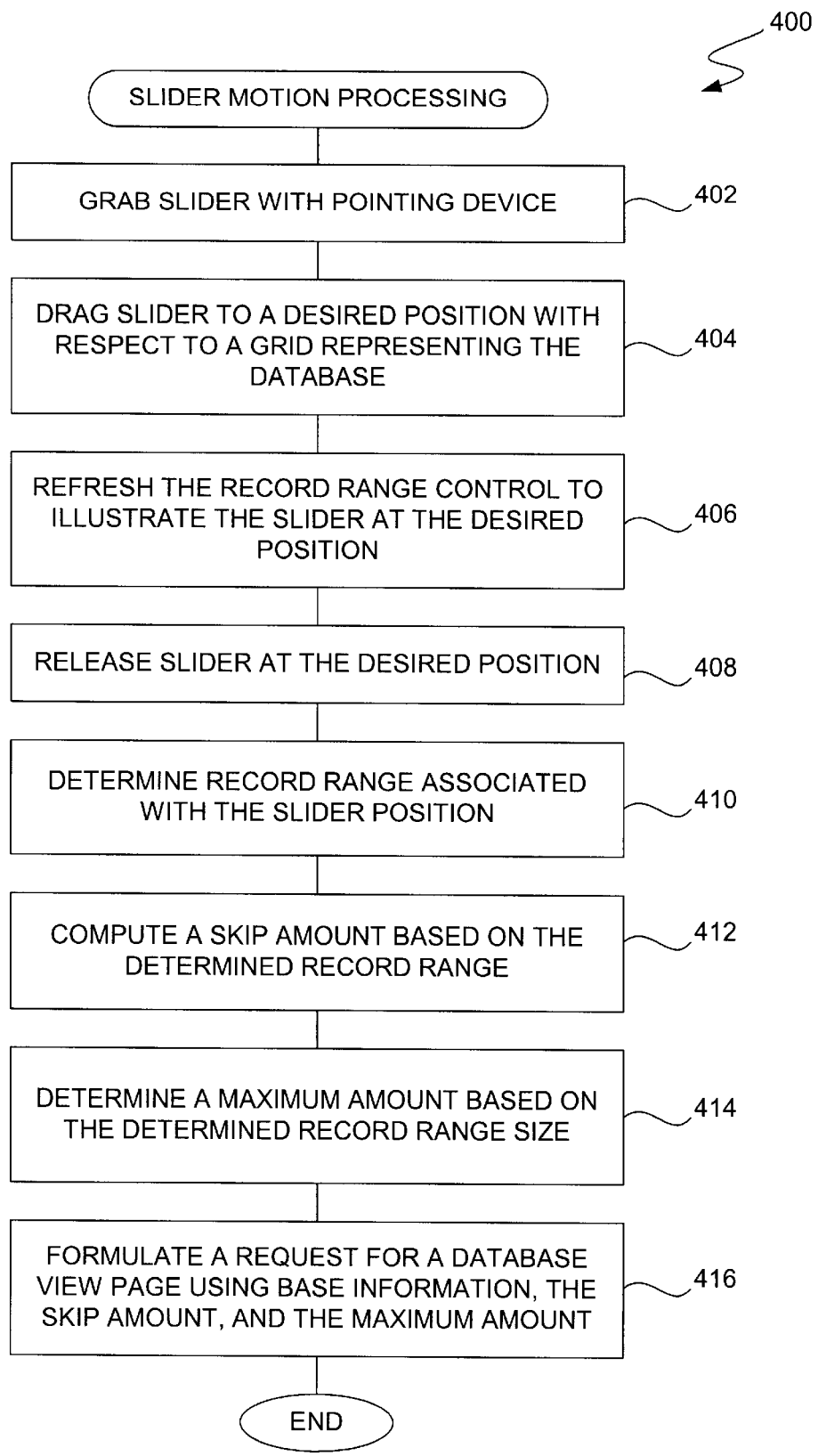
FIG. 4 is a flow diagram of slider motion processing according to an embodiment of the invention.

FIG. 4 is a flow diagram of slider motion processing 400 according to an embodiment of the invention. The slider motion processing 400 is one particular type of manipulation of the record range control. For example, the slider control can be the slider control 308 of the record range control 300 illustrated in FIG. 3. The slider motion processing 400 would be detailed processing that is associated with the blocks 224 and 226 of FIG. 2B.

The slider motion processing 400 initially grabs 402 the slider with a pointing device. Here, the record range control, including the slider, is displayed on a display screen, and a user can grab 402 the slider with a pointing device (e.g., mouse, trackball, etc.). Next, the slider is dragged 404 to a desired position with respect to a grid representing the database. As an example, with respect to FIG. 3, the slider 308 can be dragged with respect to the grid 306 illustrated in FIG. 3. As the slider is being dragged, the slider motion processing 400 causes the record range control to be refreshed 406 to illustrate the slider at the desired position.

In one embodiment, the record range control is provided on the display screen by a browser (e.g., network browser). The browser causes the record range control to be modified (e.g., refreshed) as the slider is dragged such that the dragging of the slider is responsive or, in other words, is updated in nearly real time. In one implementation, the dragging of the slider and the associated refreshing of the record range control are provided by JAVA programming resident on the remote machine. Alternatively, the dragging of the slider and the associated refreshing of the record range control could be implemented by a series of icons having the slider positioned at different locations with respect to the background grid. The appropriate icon could then be displayed depending on the location of the slider with respect to the record range control.

In any case, following the dragging 404 and the refreshing 406, the slider is released 408 at the desired position. Once the slider is released 408, the slider motion processing 400 understands that the user has made a selection of a record range that the user is interested in viewing. However, because the slider was used to graphically select the record range, the slider motion processing 400 operates to determine 410 an appropriate record range associated with the slider position. Next, a skip amount is computed 412 based on the determined record range. The skip amount is measured from the start of the record range. A maximum amount is also determined 414 based on the determined record range size. Here, the maximum amount is the number of records that are to be provided in the database view page (e.g., web page) from the host machine. This maximum amount can be determined from the record range that has been determined. An example illustrating the determining of the slider position, the skip amount and the maximum amount is provided below with respect to FIG. 9C. A default maximum amount can also be initially used. Next, a request for a database view page is formulated 416 using base information, the skip amount and the maximum amount. Following block 416, the slider motion processing 400 is complete and ends. However, as previously noted, other processing such as illustrated in FIGS. 2A and 2B would thereafter be carried out to provide and display the database view page to a user of the remote machine.

Figure 5:
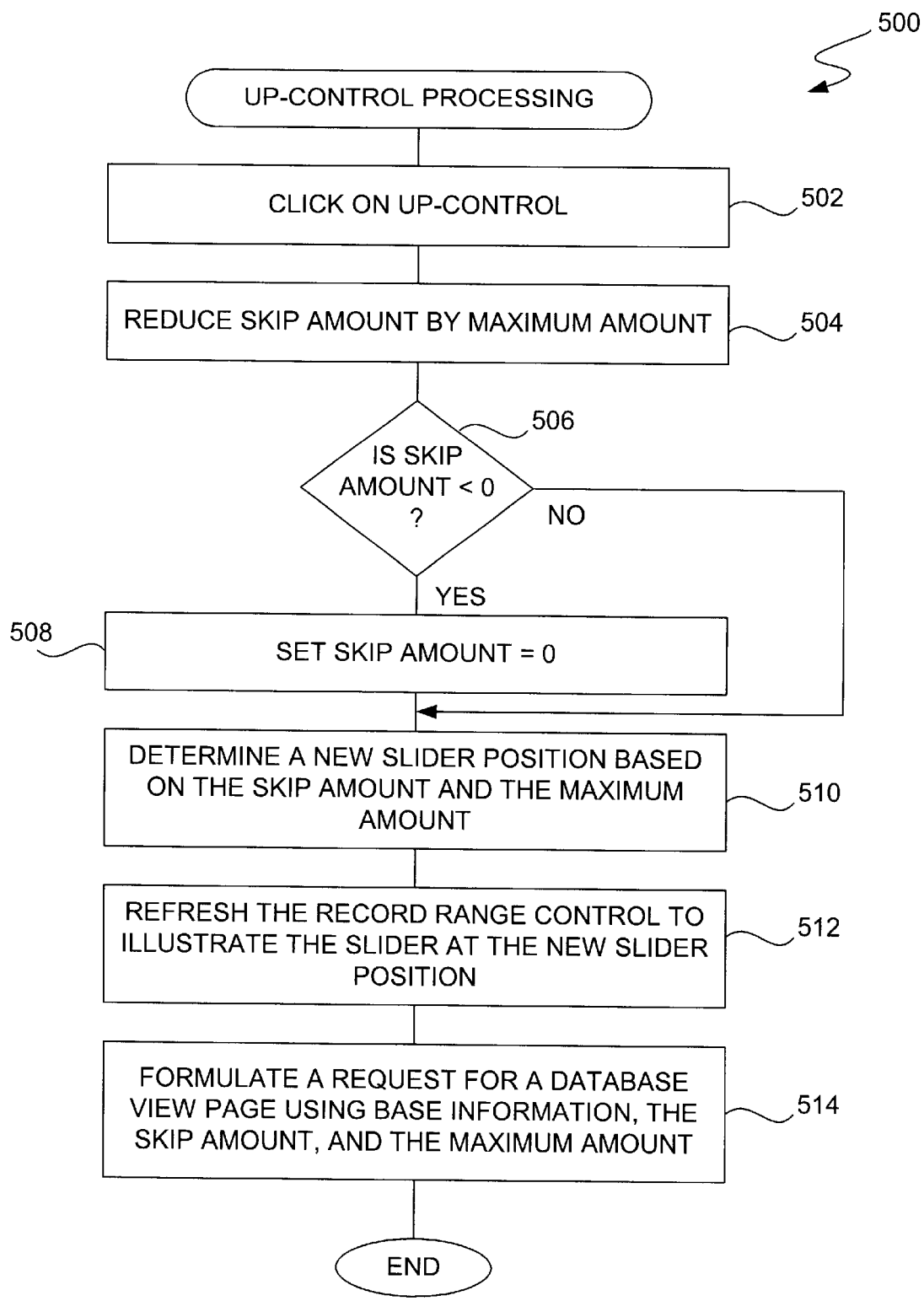
FIG. 5 is a flow diagram of up-control processing according to an embodiment of the invention.

FIG. 5 is a flow diagram of up-control processing according to an embodiment of the invention. The up-control processing 500 is, for example, activated when a click event occurs with a pointing device located over the up-control 310 of the record range control 300 illustrated in FIG. 3.

The up-control processing 500 initially begins with a click 502 occurring on an up-control. As previously noted, the up-control is, for example, the up-control 310 of the record range control 300 illustrated in FIG. 3. Once there has been a click on the up-control, then the skip amount is reduced 504 by the maximum amount. The skip amount and maximum amount are previously known or obtained from the database view page currently being displayed. Following block 504, a decision block 506 determines whether the skip amount is less than zero (0). When the decision block 506 determines that the skip amount is less than zero (0), then the skip amount is set 508 to zero (0). On the other hand, when the decision block 506 determines that the skip amount is not less than zero (0), then block 508 is bypassed.

Next, a new slider position is determined 510 based on the skip amount and the maximum amount. Then, the record range control is refreshed 512 to illustrate the slider at a new slider position. Thereafter, a request for a database view page is formulated 514 using base information, the skip information and the maximum amount.

Following block 514, the up-control processing 500 is complete and ends. However, as previously noted, following the up-control processing 500, the remote database view processing 200 illustrated in FIG. 2B would operate to request, receive and display the database view page being requested.

Figure 6:
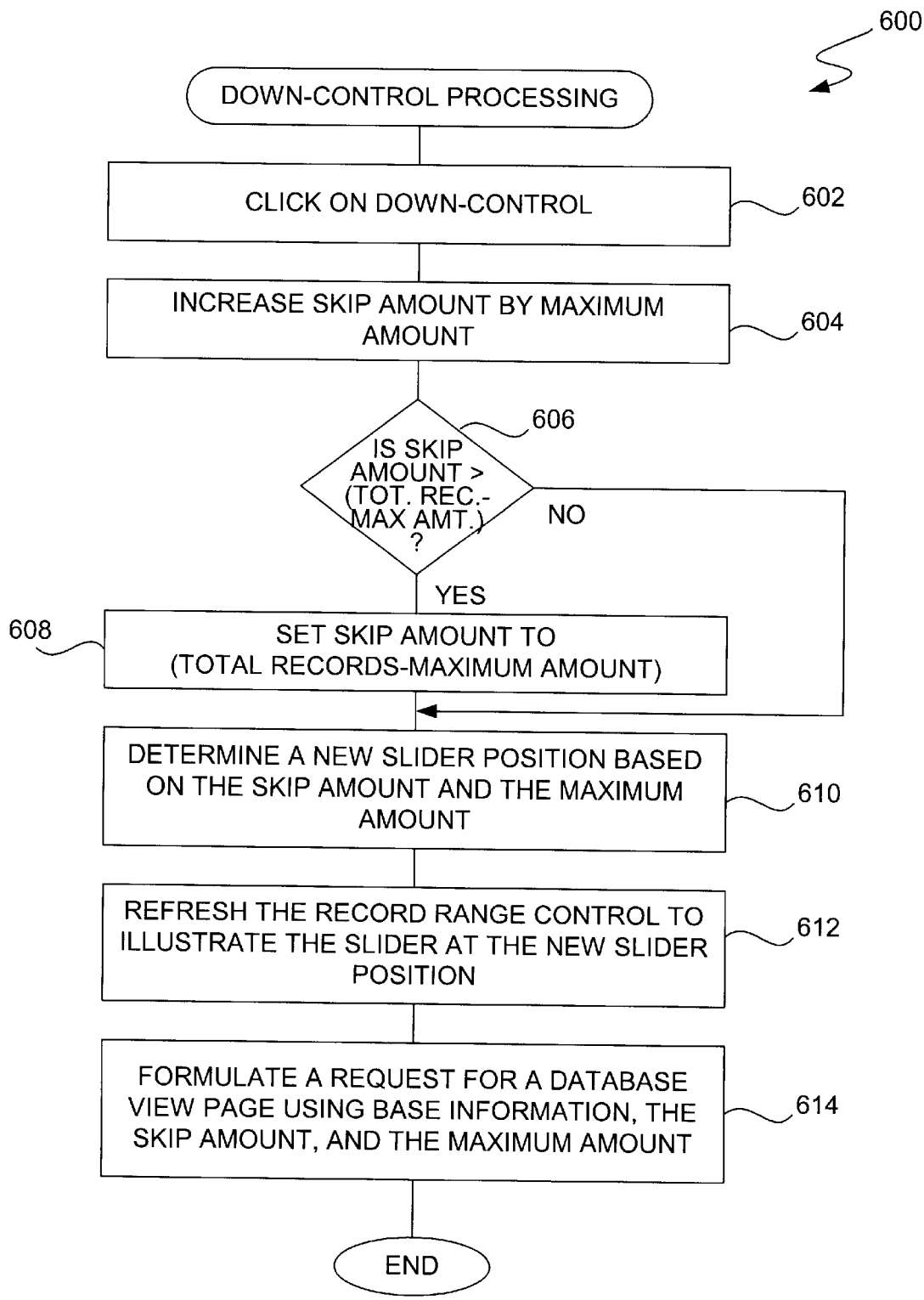
FIG. 6 is a flow diagram of down-control processing according to an embodiment of the invention.

FIG. 6 is a flow diagram of down-control processing 600 according to an embodiment of the invention. The down-control processing 600 is, for example, associated with processing performed when a click event occurs on the down-control 312 of the record range control 300 illustrated in FIG. 3.

The down-control processing 600 begins when a click event 602 occurs on a down-control. Once the click-event has occurred, the skip amount is increased 604 by the maximum amount. Then, a decision block 606 determines whether the skip amount is greater than the total number of records minus the maximum amount. When the decision block 606 determines that the skip amount is greater than the total number of records minus the maximum amount, then the skip amount is set 608 to the total number of records minus the maximum amount (total records—maximum amount). On the other hand, when the decision block 606 determines that the skip amount is not greater than the total number of records minus the maximum amount, then the block 608 is bypassed. Blocks 606 and 608 ensure that the records to be requested following the click-event do not exceed the available records in the database.

Next, a new slider position is determined 610 based on the skip amount and the maximum amount. Here, the down-control processing 600 operates to determine where the new slider should be positioned with respect to the background grid because, in this case, the down-control was selected and the slider control was not dragged or dropped to the appropriate position. In any case, once the new slider position has been determined 610, the record range control is refreshed 612 to illustrate the slider at the new slider position. In effect, the slider is moved down by the maximum amount of records being contained within a database view page so that the next set of records can be viewed. Thereafter, a request for a database view page is formulated 614 using base information, the skip amount and the maximum amount. Following block 614, the down-control processing 600 is complete and ends. However, as previously noted, following the down-control processing 600, the remote database view processing 200 illustrated in FIG. 2B would operate to request, receive and display the database view page being requested.

Figure 7:
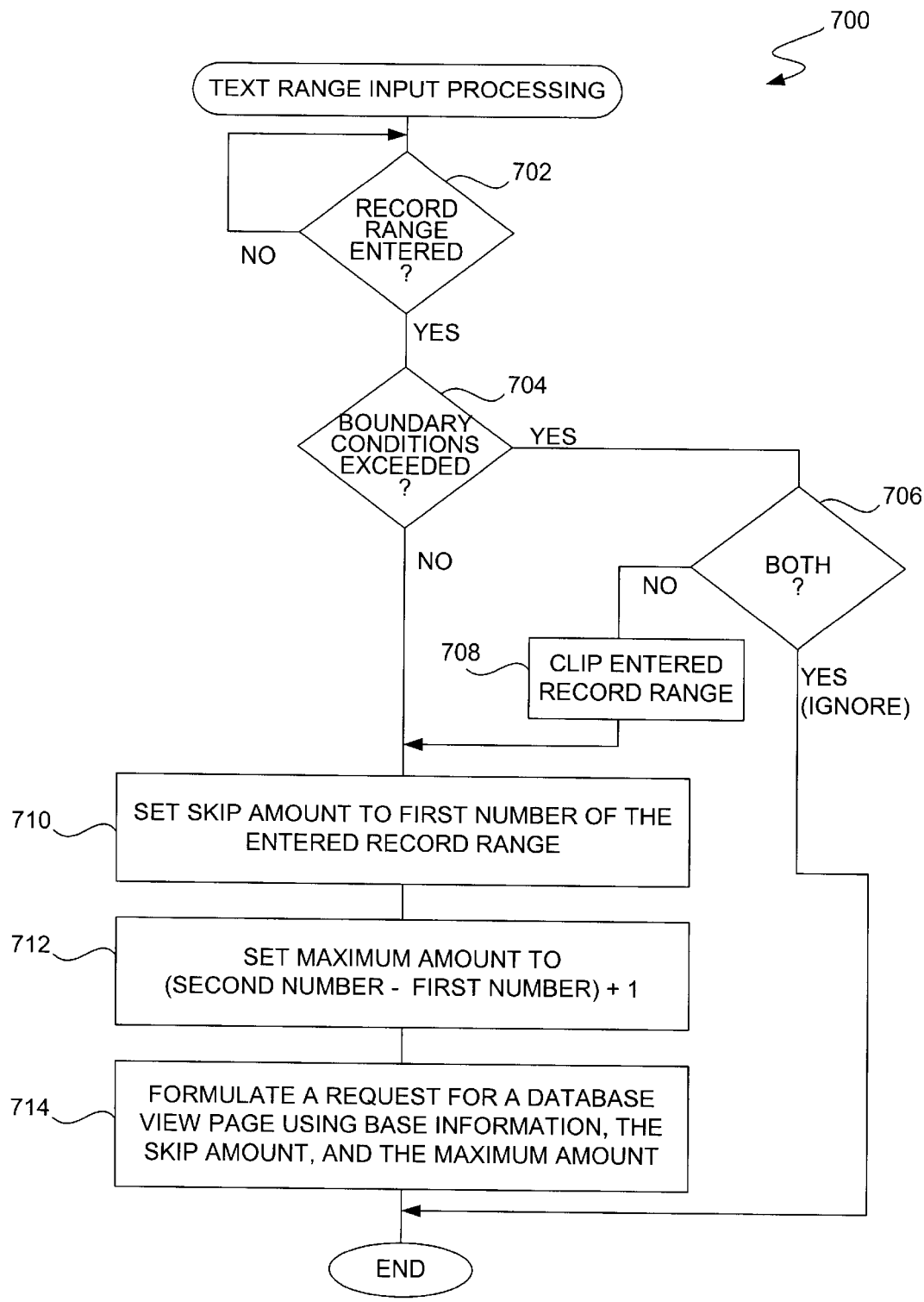
FIG. 7 is a flow diagram of text range input processing according to an embodiment of the invention.

FIG. 7 is flow diagram of text range input processing 700 according to an embodiment of the invention. The text range input processing 700 is, for example, associated with a user entering text into the record range text box 316 of the record range control 300 illustrated in FIG. 3.

The text range input processing 700 begins with a decision block 702. The decision block 702 determines whether a record range has been entered. The record range includes two numbers, a first number and a second number. With respect to FIG. 3, the record range itself would be provided within the record range text box 316, and that range would thereafter be entered by the selection of the record range enter button 318. The decision block 702 causes the text range input processing 700 to await the indication that a record range has been entered. However, once the decision block 702 determines that a record range has been entered, then the text range input processing 700 continues with a decision block 704. The decision block 704 determines whether boundary conditions on the record range have been exceeded. For example, the boundary conditions for a record range are that the first record is record 1 and the last record is representative of the total number of records. For example, if a database has 50 records, the boundary conditions would be record 1 and record 50. When the decision block 704 indicates that one or more of the boundary conditions have been exceeded, then a decision block 706 determines whether both boundary conditions have been exceeded. When the decision block 706 determines that both boundary conditions have been exceeded, then the record range request that has been entered is ignored and the text range input processing 700 is complete and ends. In such a case, the prior record range is recovered and redisplayed in the record range text box. On the other hand, when the decision block 706 determines that only one of the boundary conditions has been exceeded, then the particular boundary condition that was exceeded is used to clip 708 the entered record range.

Following block 704 when neither boundary condition was exceeded, or following block 708 when a single boundary condition was exceeded, the text range input processing 700 then sets 710 the skip amount to the first number of the entered record range. The maximum amount is set 712 to the difference between the first and second numbers incremented by 1 (namely, second number−first number+1). Then, a request for a database view page is formulated 714 using base information, the skip amount and the maximum amount. Following block 714, the text range input processing 700 is complete and ends. However, as previously noted, following the text range input processing 700, the remote database view processing 200 illustrated in FIG. 2B would operate to request, receive and display the database view page being requested.

Figure 8:
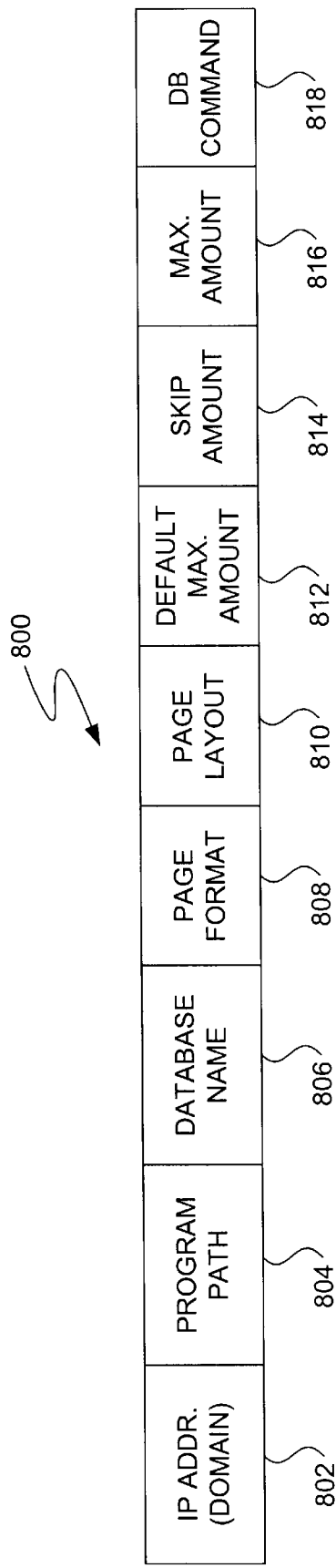
FIG. 8 is a diagram of a request structure for use with an embodiment of the invention.

FIG. 8 is a diagram of a request structure 800 for use with the invention. The request structure 800 represents the structure of the request by a remote server to the host machine. For example, with respect to FIG. 3, the network browser 112 sends a request having the request structure 800 to the network server 110 in the host machine 102. The network server 110 within the host machine 102 utilizes the request structure 800 to identify the database 108, inform itself as to the layout requested for a database view page, and identify the appropriate records of the database to be provided to the user of the remote machine in the database view page.

The request structure 800 includes an IP address 802, a program path 804, a database name 806, a page format 808, a page layout 810, a default maximum amount 812, a skip amount 814, a maximum amount 816, and a database command 818. In a preferred embodiment, the request structure 800 is provided in a request sent from a remote machine to the host machine. In one embodiment, the request is a HTTP GET Request that contains all the information needed by the host machine concatenated thereto. The information provided with the HTTP GET Request enables the host machine to identify, access and retrieve the appropriate records from an appropriate database. The information provided with the HTTP GET Request can also identify a format for a database view page that is to be returned and displayed at the remote machine. Since many networks (including the Internet) are stateless connections, the request structure 800 carries a lot of state information in it so that the proper database records are able to be retrieved even though there is no on-going connection between the remote machine. In other words, the fields 802–812 of the request structure 800 are referred to as base information which is generally static information. The base information is also often referred to as state information in the context of Internet programming. The fields 814 and 816 are dynamic fields that change as a user manipulates the record range control. Examples of typical manipulations of the record range control include, a click-up event, a click-down event, a slider drag and drop event, and a text box enter event. The processing associated with each of these events has been discussed above. The database command field 818 contains a command for the database (e.g., FIND, SEARCH, etc.). Normally, the pertinent command for the manipulations of the record range control to obtain a new database view page is a FIND command.

FIGS. 9A–9I are screen shots from a database software program known as FileMaker Pro 4.0 that implements an exemplary embodiment of the invention. These screen shots are produced on a display device by a network browser on a remote machine. The screen shots are discussed below with respect to the processing described above with respect to FIGS. 2A–7.

Figure 9A:
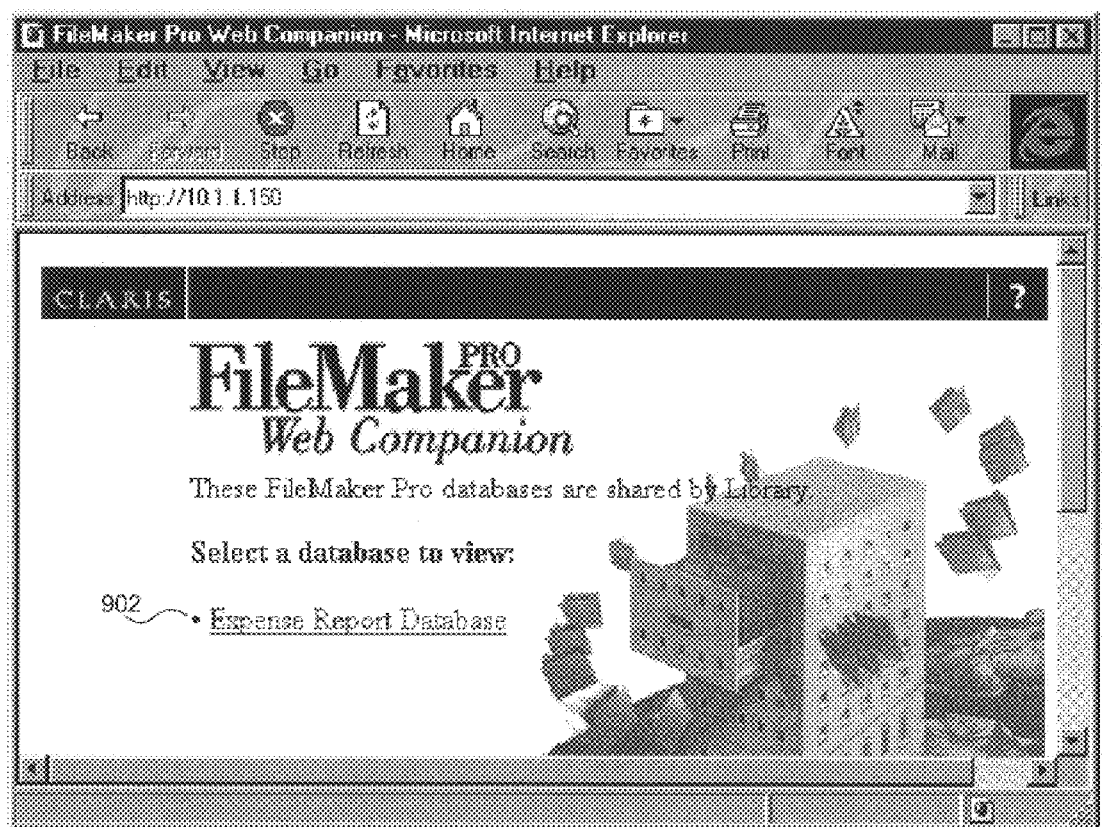
FIGS. 9A–9I are screen shots from a database software program that implements an exemplary embodiment of the invention.

FIG. 9A is a screen shot of a representative database home page 900. The representative home page 900 includes a list 902 of available databases, which in this example, is one—Expense Report Database. The representative database home page 900 would be displayed by block 208 in FIG. 2A.

Figure 9B:
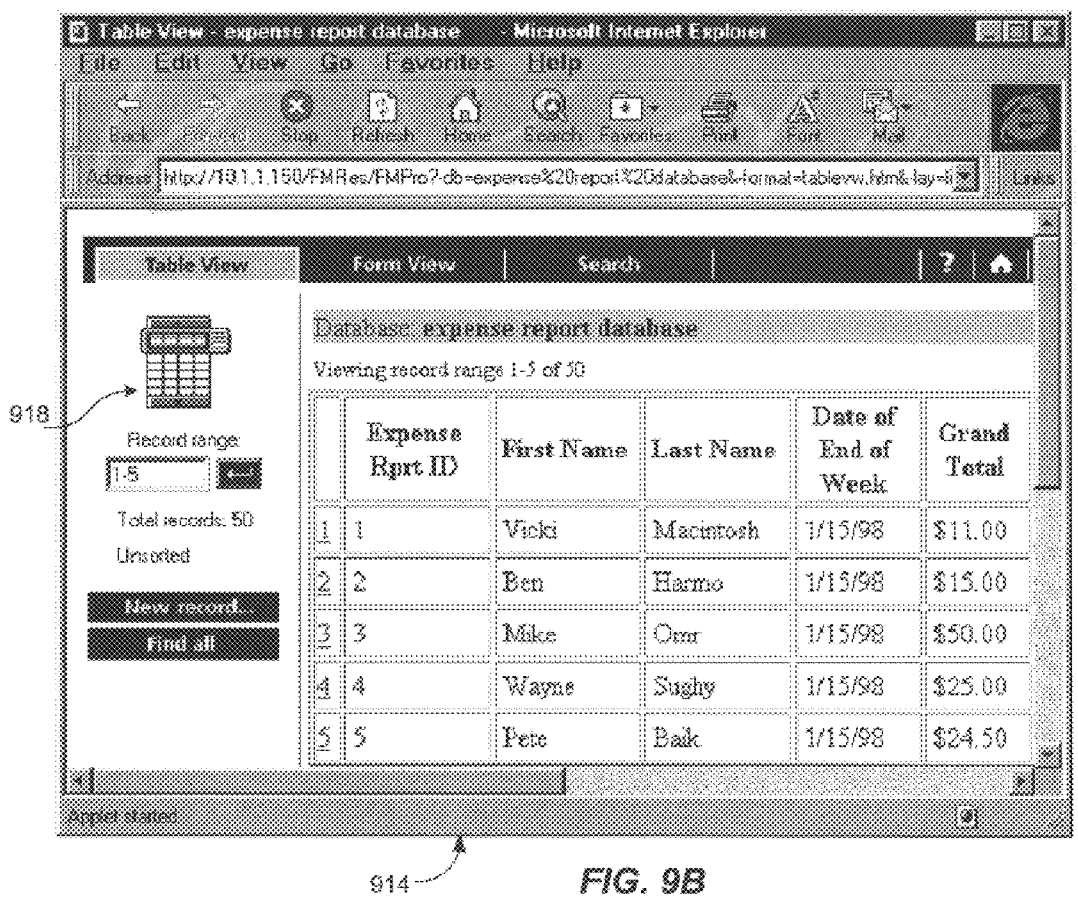

FIG. 9B is a screen shot of representative default database view page 914. The representative default view page 914 would be displayed by block 216 in FIG. 2B. In this example, the representative default database view page 914 would correspond to the Expense Report Database that was made available to a user by the representative home page 900 (FIG. 9A). The representative default database view page 914 illustrated in FIG. 9B illustrates a Table View of certain records of the Expense Report Database in a records area 916 and illustrates a record range control in a control area 918 of the representative default database view page 914. The record range control in FIG. 9B is constructed as is the record range control 300 illustrated in FIG. 3. Specifically, for the representative default database view page 914, the record range being view is records 1–5 as shown in a record range text box of the record range control These records 1–5 of the Expense Report Database are displayed in the records area 916.

Figure 9C:

FIG. 9C is a screen shot of a database view page 920 following manipulation of the record range control of a slider control. The position of the slider control of the record range control has been moved by user action from its top position in FIG. 9B to an intermediate position with respect to a background grid. For example, the user action clicks-on the slider control, drags it downward, and releases it at the intermediate position. As such, the record range to be viewed in the database view page 920 now consists of records 33–37. Hence, the records area 916 displays records 33–37 of the Expense Report Database. The record range text box is also updated to correspond to records 33–37.

With respect to the slider motion processing 400, the determination of the record range associated with the slider position is as follows for this example. The slider position is known to the remote machine. The position of the top of the slider control within the background grid is proportional to the position of the first record in the record range. The number of initial records to skip before reaching the first record in the record range is then determined by the following equation (1).

$$SP/(RCH-SH) \times (TR-\text{Max. Amt.}) \tag{1}$$

where SP is the slider position, RCH is the height of the record range control, SH is the height of the slider control, TR is the total number of records, and Max. Amt. is the maximum number of records to be view in a database view page. For example, if the slider position is 38, the record range control height is 100, the slider height is 10, the total records is 50 and the maximum amount is 5, then the skip amount would be 32. Hence, as illustrated in FIG. 9C, the new record range would start at record 33 (i.e., after skipping 32 records) and would end (maximum amount) at record 37 (i.e., 32+5).

Having determined the skip amount and the maximum amount, the request that would be formulated in block 416 of the slider motion processing 400 would include the skip amount and the maximum amount. For example, a representative HTTP request that would produce the screen shot of FIG. 9C would be as follows:

http://10.1.1.150/FMRes/FMPro?-db=
expense%20report%20database&-format =tablevw.htm&-lay=
list%20view&-token=25&-skip=32&-max=5&-find With respect to the request structure 800 shown in FIG. 8, the representative HTTP request has the following fields and their associated information.

| | |
|---|---|
| IP Address | 10.1.1.150 |
| Program Path | FMRes/FMPro |
| Database Name | expense report database |
| Page Format | tablevw.htm |
| Page Layout | list view |
| Default Maximum Amount | 25 |
| Skip Amount | 32 |
| Maximum Amount | 5 |
| Database Command | find |

Figure 9D:
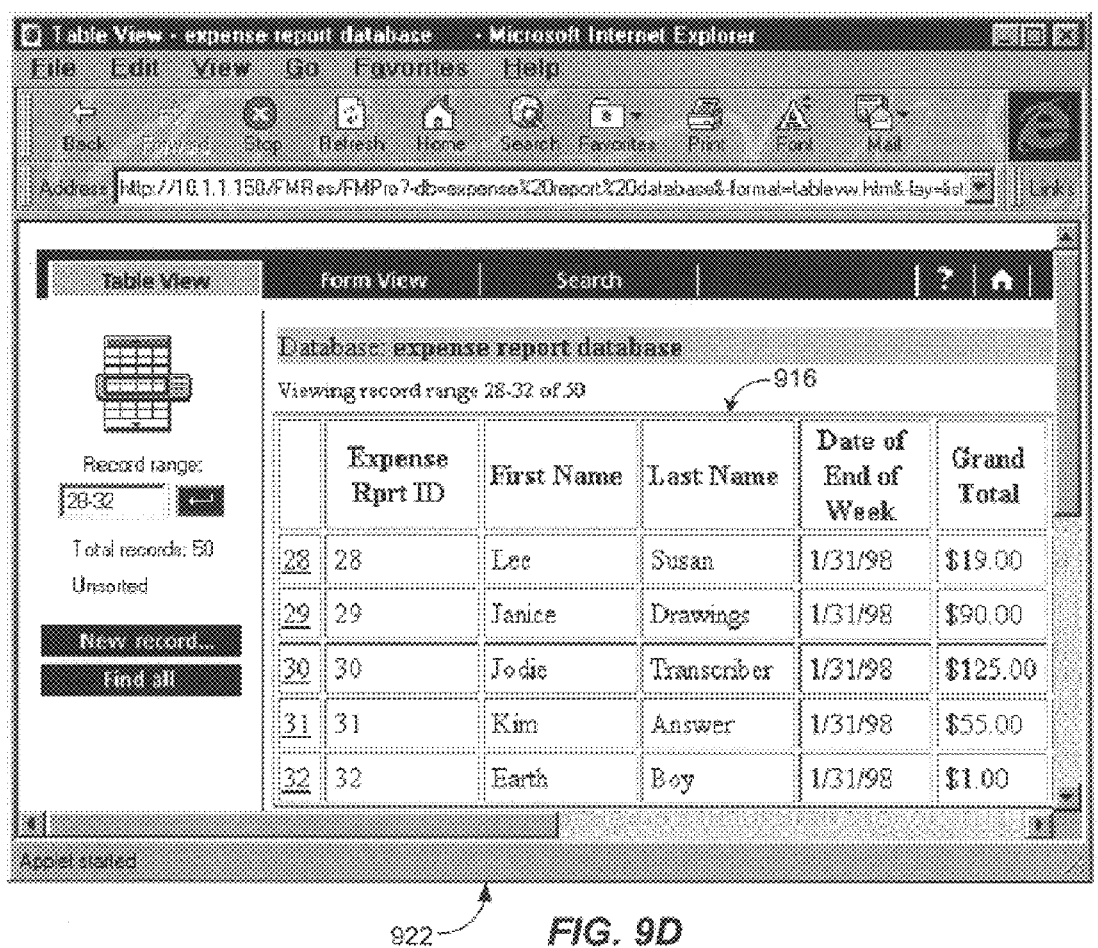
Figure 9E:
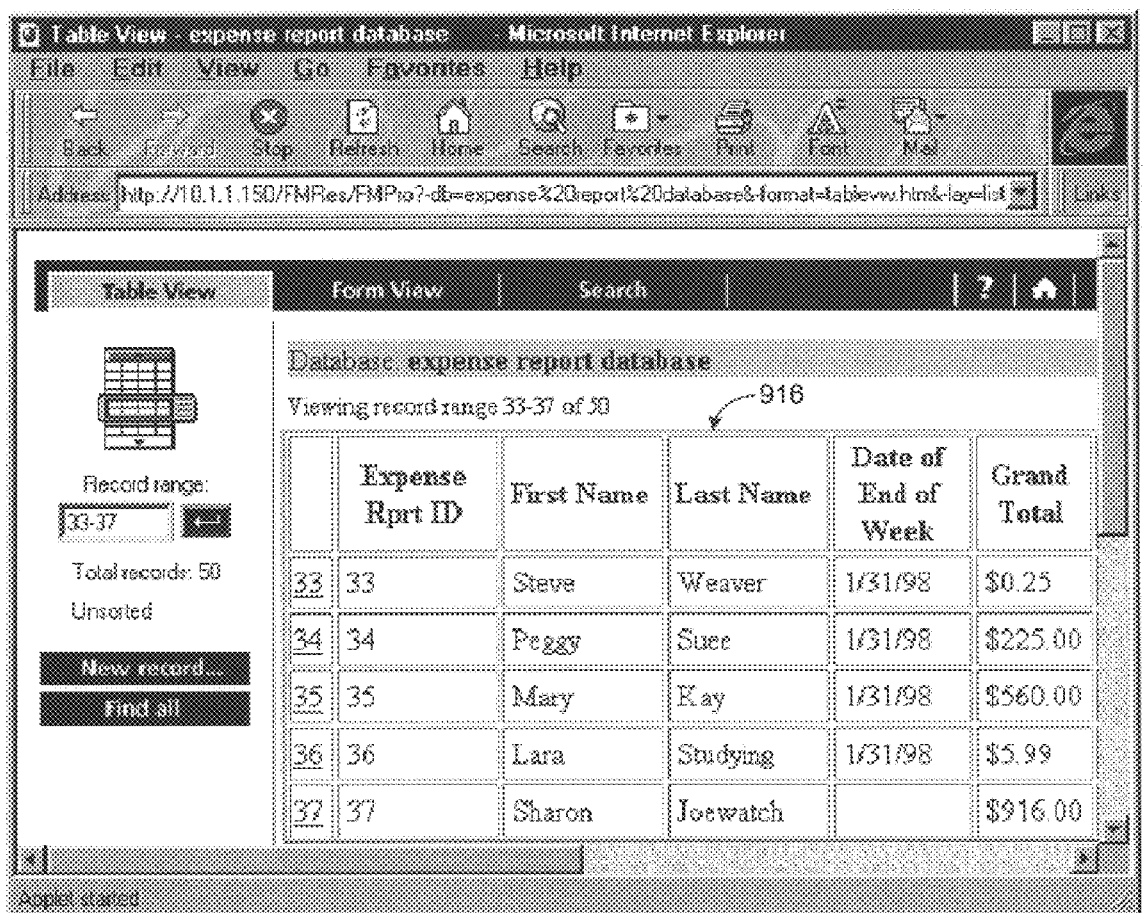
Figure 9F:
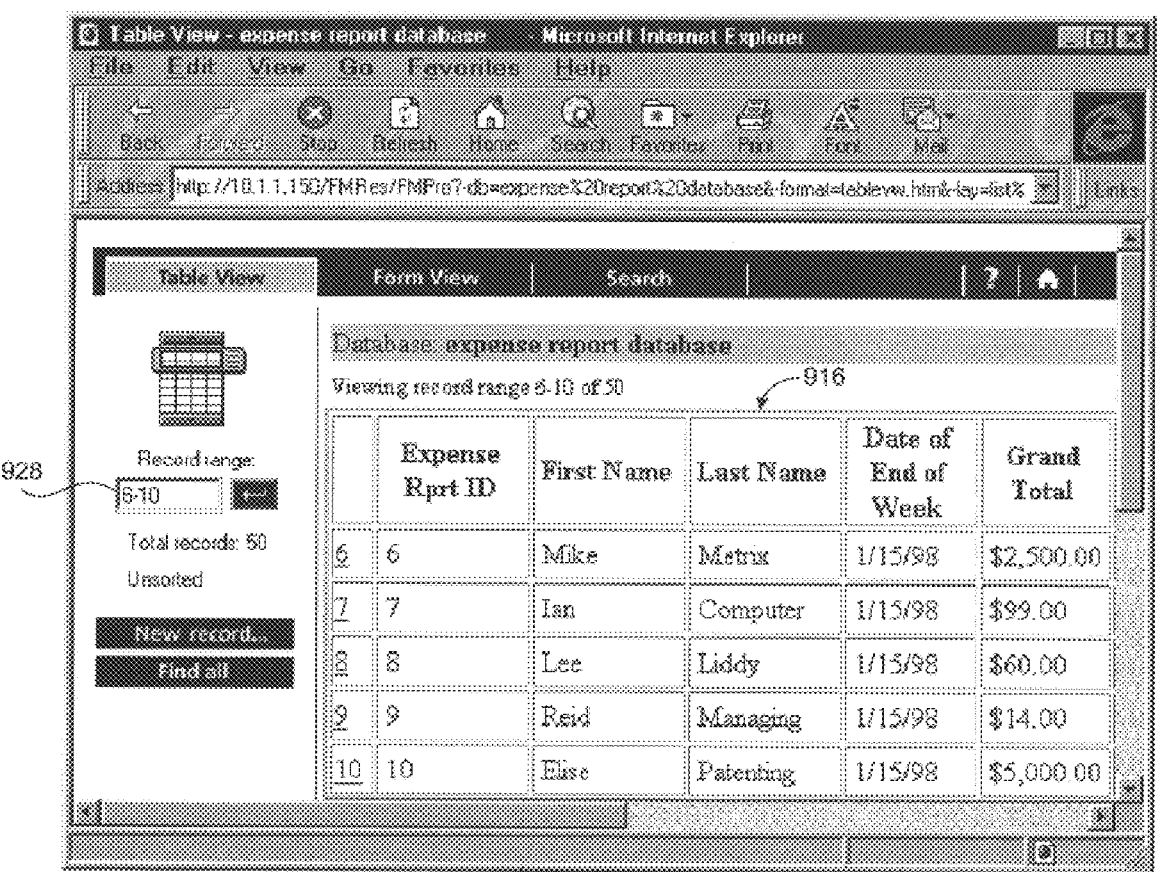
Figure 9G:
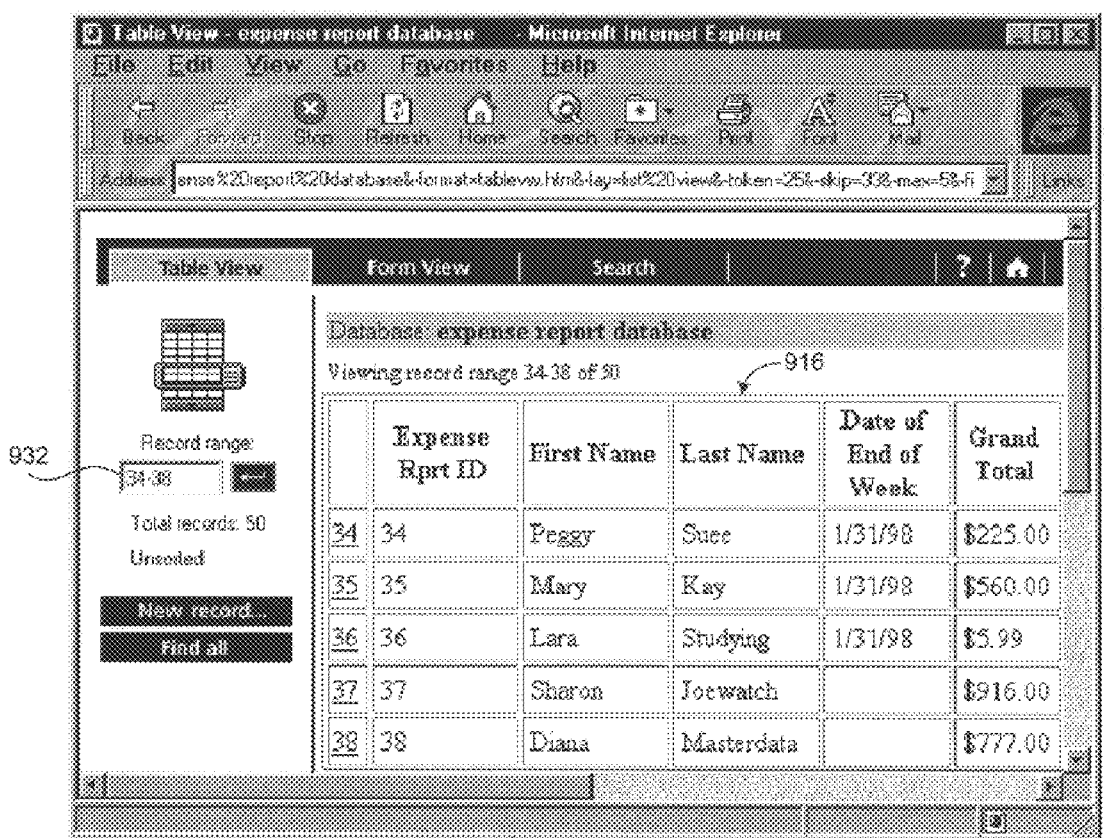
Figure 9H:
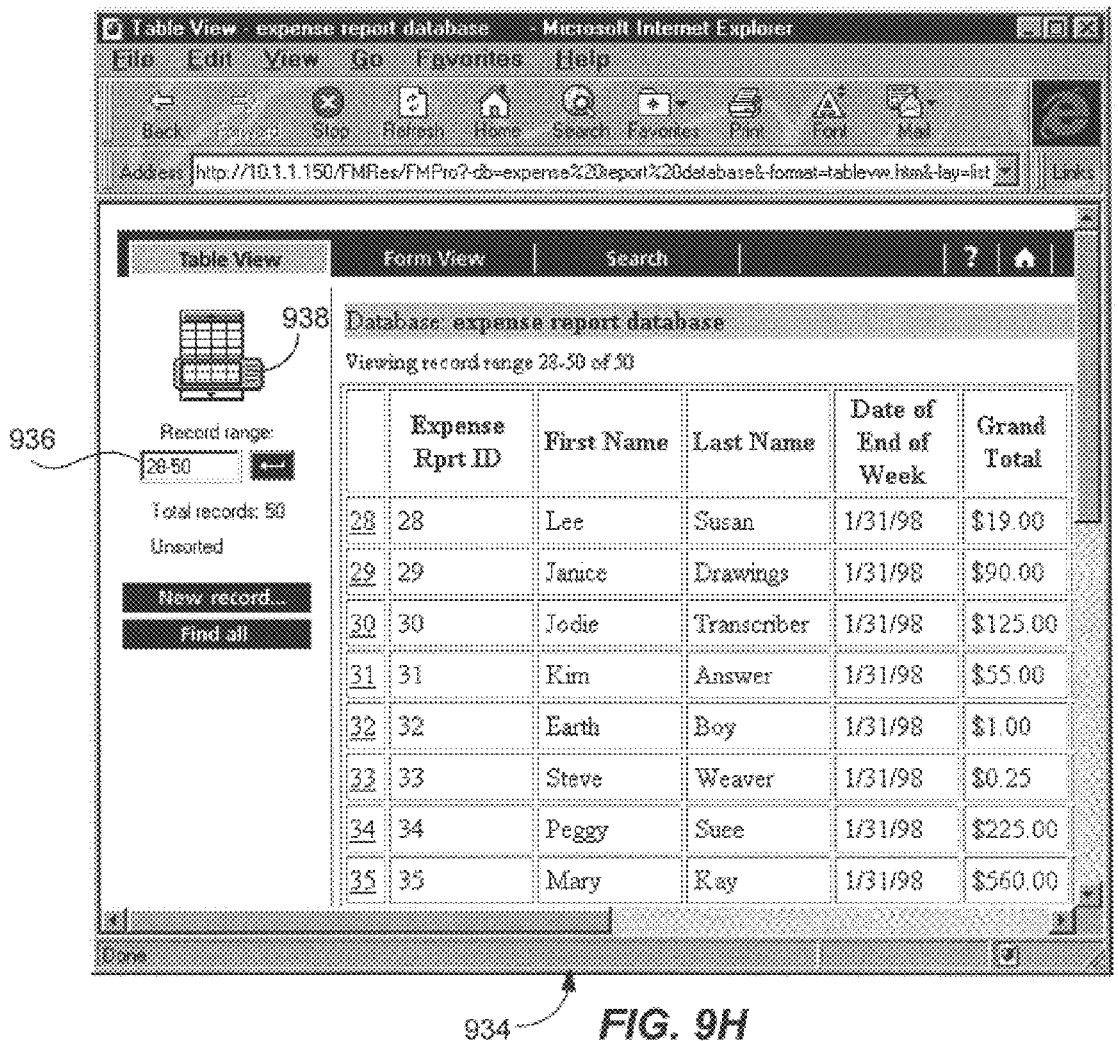

FIG. 9D is a screen shot of a database view page 922 following an up-control event from the database view page 920 of FIG. 9C. In FIG. 9C the record range was 33–37, now after the up-control event and the up-control processing 500 of FIG. 5, the record range is 28–32. Note that the records area 916 includes the records 28–32, and that the position of the slider control with respect to the grid has moved upward. A representative HTTP request that would produce the screen shot of FIG. 9D would be as follows:

http://10.1.1.150/FMRes/FMPro?-db=
        expense%20report%20database&-format =tablevw.htm&-lay=
        list%20view&-token=25&-skip=27&-max=5&-find FIG. 9E is a screen shot of a database view page 924 following a down-control event from the database view page 922 of FIG. 9D. In FIG. 9D the record range was 28–32, now after the down-control event and the down-control processing 600 of FIG. 6, the record range is 33–37. Note that the records area 916 includes the records 33–37, and that the position of the slider control with respect to the grid has moved downward as compared to its position in FIG. 9D. A representative HTTP request that would produce the screen shot of FIG. 9E would be as follows:

http://10.1.1.150/FMRes/FMPro?-db=
        expense%20report%20database&-format =tablevw.htm&-lay=
        list%20view&-token=25&-skip=32&-max=5&-find FIG. 9F is a screen shot of a database view page 926 following a text range input. The desired record range is input into a record range text box 928. In this example, the desired record range 6–10 is entered in the record range text box 928. Note that the records area 916 displays the records 6–10, and that the position of the slider control with respect to the grid is generally at the upper portion of the upper half. According to the text range input processing 700, the appropriate skip amount and maximum amount are determined, and then a request for a database view page is made. Here, for this example, the skip amount is 5 and the maximum amount is 5. A representative HTTP request that would produce the screen shot of FIG. 9F would be as follows:

http://10.1.1.150/FMRes/FMPro?-db=
        expense%20report%20database&-format =tablevw.htm&-lay=
        list%20view&-token=25&-skip=5&-max=5&-find FIG. 9G is a screen shot of a database view page 930 following another text range input. The desired record range is input into a record range text box 932. In this example, the desired record range 34–38 is entered in the record range text box 932. Note that the records area 916 displays the records 34–38, and that the position of the slider control with respect to the grid is generally at the upper portion of the lower half. According to the text range input processing 700, the appropriate skip amount and maximum amount are determined, and then a request for a database view page is made. Here, for this example, the skip amount is 33 and the maximum amount is 5. A representative HTTP request that would produce the screen shot of FIG. 9G would be as follows:

http://10.1.1.150/FMRes/FMPro?-db=
        expense%20report%20database&-format =tablevw.htm&-lay=
        list%20view&-token=25&-skip=33&-max=5&-find FIG. 9H is a screen shot of a database view page 934 following yet another text range input. The desired record range is input into a record range text box 936. In this example, the desired record range 28–50 is entered in the record range text box 932. Note that the records area displays the records 28–50, and that the position of a slider control 938 with respect to the grid is generally at the lower half. According to the text range input processing 700, the appropriate skip amount and maximum amount are determined, and then a request for a database view page is made. Here, for this example, the skip amount is 27 and the maximum amount is 23. A representative HTTP request that would produce the screen shot of FIG. 9H would be as follows:

http://10.1.1.150/FMRes/FMPro?-db=
        expense%20report%20database&-format =tablevw.htm&-lay=
        list%20view&-skip=27&-max=23&-find Also note that the height of the slider control 938 is greater than it is in FIGS. 9B–9G. Here, the maximum value is 23, whereas in FIGS. 9B–9C the maximum value is 5. Thus, the height of the slider control 938 can vary depending on the proportion of the total number of records of the database being viewed in the database view page. For example, the portion of the totals records that are being viewed is 23/50 which is approximately one-halve, thus the height of the slider control 938 covers just less than halve of the background grid of the record range control. A minimum height is advisable to prevent the slider control from becoming too small in large databases.

In an alternative embodiment, the desired record range 28–50 could have been selected by using the down-control 312 to reach the end of the database and click and drag a slider width adjustment control (not shown). This action thus could be used to increase the height of the slider control 938 so that it is as shown in FIG. 9H.

Figure 9I:
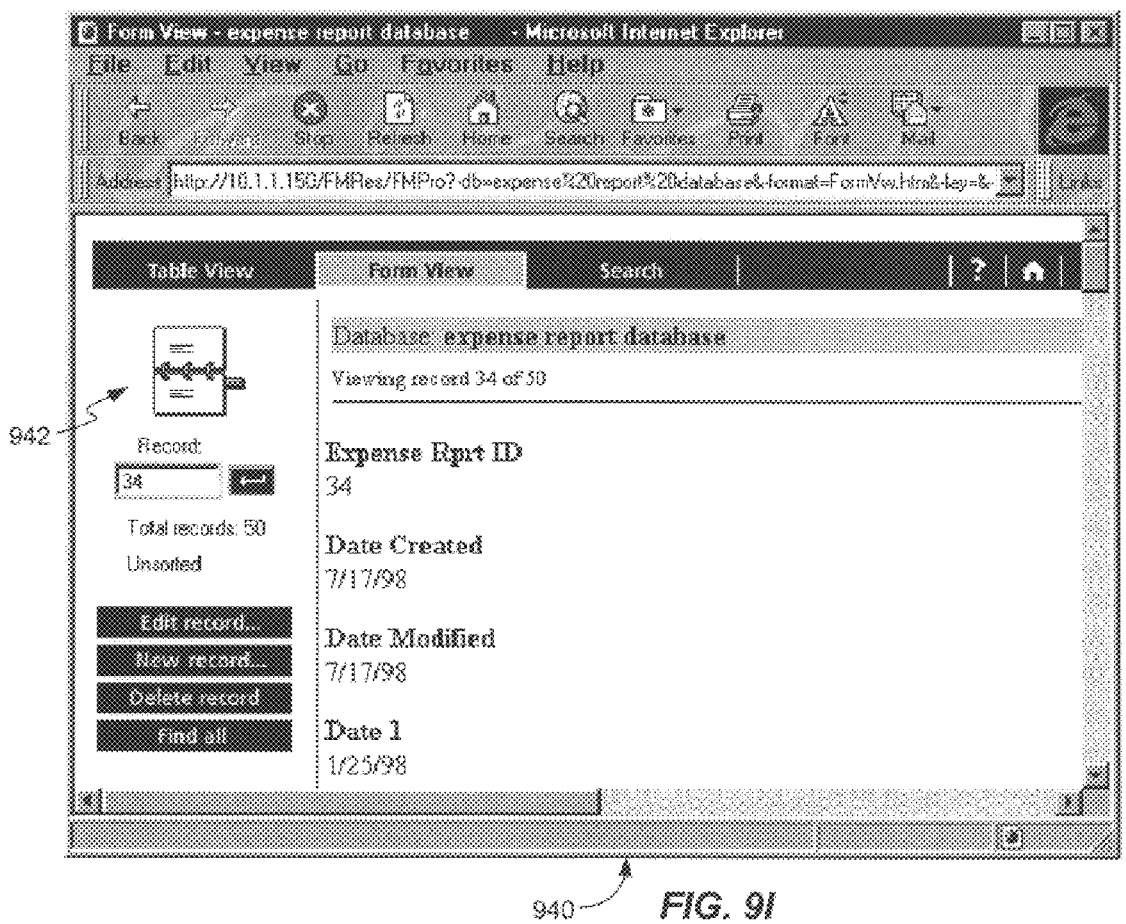

FIG. 9I is a screen shot of a form view of a database view page 940. The database view page 940 is in a Form View and thus appears different than the prior screen shots which pertained to a Table View. The database view page 940 is a Form View for a single record, namely record 34 of the Expense Report Database. The record range control is no longer present. Instead, a control is provided in a control area 942 and permits a user to request individual records by number or by a next or previous event. Note that in the Form View individual records of the database can be created, deleted or edited.

Figure 10:
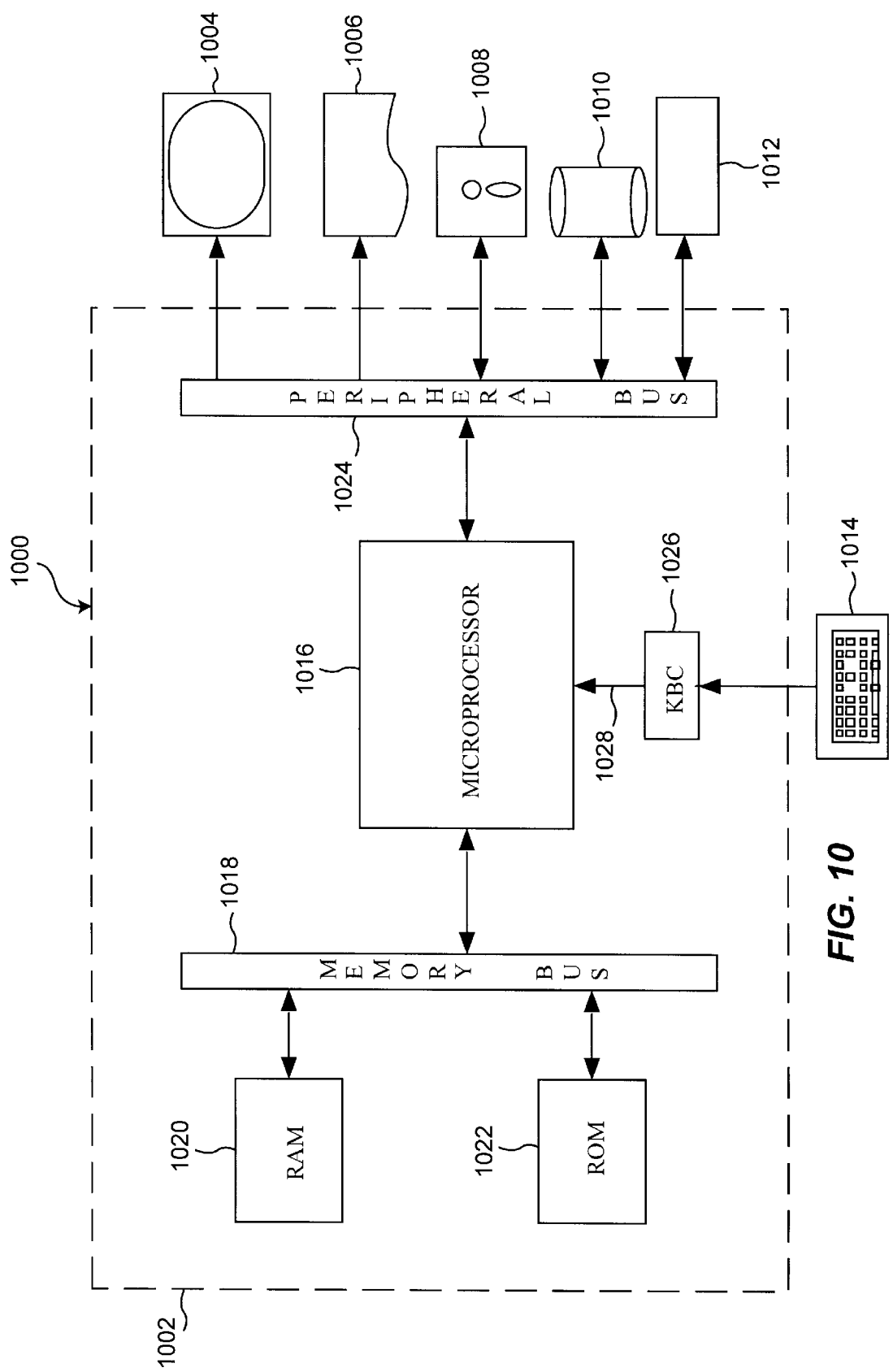
FIG. 10 is a block diagram of an exemplary computer system for carrying out the processing according to the invention.

FIG. 10 is a block diagram of an exemplary computer system 1000 for carrying out the processing according to the invention. The computer system could be used to implement the host machine 102 or the remote machine 102 illustrated in FIG. 1.

The computer system 1000 includes a digital computer 1002, a display screen (or monitor) 1004, a printer 1006, a floppy disk drive 1008, a hard disk drive 1010, a network adapter 1012, and a keyboard 1014. The digital computer 1002 includes a microprocessor 1016, a memory bus 1018, random access memory (RAM) 1020, read only memory (ROM) 1022, a peripheral bus 1024, and a keyboard controller 1026. The digital computer 1002 can be a personal computer, a workstation computer, or some other type of computer.

The microprocessor 1016 is a general purpose digital processor which controls the operation of the computer system 1000. The microprocessor 1016 can be a single-chip processor or can be implemented with multiple components. Using instructions retrieved from memory, the microprocessor 1016 controls the reception and manipulation of input data and the output and display of data on output devices. According to the invention, as described above, some particular functions of microprocessor 1016 are to provide, display and utilize a record range control to access a shared database through a network.

The memory bus 1018 is used by the microprocessor 1016 to access the RAM 1020 and the ROM 1022. The RAM 1020 is used by the microprocessor 1016 as a general storage area and as scratch-pad memory, and can also be used to store input data and processed data. The RAM 1020 also preferably stores the various data structures illustrated in FIG. 5. The ROM 1022 can be used to store instructions or program code followed by the microprocessor 1016 as well as other data.

The peripheral bus 1024 is used to access the input, output, and storage devices used by the digital computer 1002. In the described embodiment, these devices include the display screen 1004, the printer device 1006, the floppy disk drive 1008, the hard disk drive 1010, and the network adapter 1012. The keyboard controller 1026 is used to receive input from the keyboard 1014 and send decoded symbols for each pressed key to the microprocessor 1016 over bus 1028.

The display screen 1004 is an output device that displays images of data provided by the microprocessor 1016 via the peripheral bus 1024 or provided by other components in the computer system 1000. The printer device 1006 when operating as a printer provides an image on a sheet of paper or a similar surface. Other output devices such as a plotter, typesetter, etc. can be used in place of, or in addition to, the printer device 1006.

The floppy disk drive 1008 and the hard disk drive 1010 can be used to store various types of data. The floppy disk drive 1008 facilitates transporting such data to other computer systems, and hard disk drive 1010 permits fast access to large amounts of stored data.

The microprocessor 1016 together with an operating system operate to execute computer code and produce and use data. The computer code and data may reside on the RAM 1020, the ROM 1022, or the hard disk drive 1020. The computer code and data could also reside on a removable program medium and loaded or installed onto the computer system 1000 when needed. Removable program mediums include, for example, CD-ROM, PC-CARD, floppy disk, magnetic tape, and network component.

The keyboard 1014 is used by a user to input commands and other instructions to the computer system 1000. Other types of user input devices can also be used in conjunction with the present invention. For example, pointing devices such as a computer mouse, a track ball, a stylus, or a tablet can be used to manipulate a pointer on a screen of a general-purpose computer.

The invention has various advantages depending on the aspects of the invention being implemented. One advantage of the invention is that a graphical control allows a user to request a particular record range in a graphical manner. Another advantage of the invention is that the graphical control is easily manipulated to request particular record ranges. Still another advantage is that the particular record range that is requested is graphically depicted relative to the database as a whole so as to provide visual context as to the portion of the database being viewed. Yet another advantage of the invention is that a user is able to more efficiently browse a database or portion thereof (e.g., search or query results) because only a designated range of the associated records need be downloaded over the network (e.g., Internet) to the user.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A graphical user interface for a display screen of a computer system, said graphical user interface comprising:
    a background grid representing a complete set of records within a database;
    a slider bar having a width, said slider bar capable of sliding over said background grid, wherein said slider bar can be moved with a drag and drop action to slide said width of said slider bar over said background grid; and
    a record range text box that contains a record range that specifies those records of the complete set of records to be retrieved and displayed;
    wherein the position of said slider bar with respect to said background grid graphically identifies a range of those records of the complete set of records to be retrieved and displayed and graphically indicates the relative position of the range with respect to the complete set of records within the database; and
    wherein said record range can be updated in response to said slider bar sliding over said background grid.

2. A graphical user interface as recited in claim 1, wherein said width of said slider bar varies dependent on a size of the record range.

3. A graphical user interface as recited in claim 1, wherein said graphical user interface further comprises:
    an up-control positioned at an upper portion of said background grid; and
    a down-control positioned at a lower portion of said background grid.

4. A graphical user interface as recited in claim 3,
    wherein said up control operates to move said slider bar up from a current position with respect to said background grid, and
    wherein said down-control operates to move said slider bar down from a current position with respect to said background grid.

5. A graphical user interface as recited in claim 1, wherein said graphical user interface further comprises:
    a total records indicator that displays a total number of records within the database.

6. A graphical user interface as recited in claim 5,
    wherein said slider bar is moveable with respect to said background grid,
    wherein said graphical user interface further comprises a sorted-unsorted indicator that is displayed to indicate whether those records of the complete set of records to be retrieved or displayed are sorted or unsorted.

7. A graphical user interface as recited in claim 6,
    wherein said slider bar can be moved with a drag and drop action, and
    wherein said graphical user interface further comprises:
        an up control positioned at an upper portion of said background grid; and
        a down-control positioned at a lower portion of said background grid.

8. A graphical user interface as recited in claim 7 wherein said slider bar has at least two dimensions, and wherein at least one of the dimensions of said slider bar are altered dependent on the portion of the complete set of records to be retrieved or displayed.

9. A graphical user interface for a display screen of a computer system, said graphical user interface comprising:
    a background grid representing a complete set of records within a database;

a slider bar having a width, said slider bar capable of sliding over said background grid, wherein said slider bar can be moved with a drag and drop action to slide said width of said slider bar over said background grid; and a record range text box that contains a record range that specifies those records of the complete set of records to be retrieved or displayed;

wherein the position of said slider bar with respect to said background grid graphically identifies a range of those records of the complete set of records to be retrieved or displayed and graphically indicates the relative position of the range with respect to the complete set of records within the database, wherein said slider bar has at least two dimensions, and wherein at least one of the dimensions of said slider bar are altered dependent on the portion of the complete set of records to be displayed; and wherein said record range can be updated in response to said slider bar sliding over said background grid.

10. A computer-implemented method for displaying a visual indication of a position within a database having records, said method comprising:

(a) determining a record range within the database to view; and (b) displaying a record range indicator on a display screen of a computer system, said record range indicator graphically illustrating the relative position of the determined record range with respect to the complete set of records of the database, wherein the record range indicator comprises:

a background grid representing a complete set of records within a database, a slider bar having a width, said slider bar capable of sliding over said background grid, wherein said slider bar can be moved with a drag and drop action to slide said width of said slider bar over said background grid, and a record range text box that contains a record range that specifies those records of the complete set of records to be retrieved or displayed;

wherein the position of said slider bar with respect to said background grid identifies those records of the complete set of records to be retrieved or displayed; and wherein said record range can be updated in response to said slider bar sliding over said background grid.

11. A computer-implemented method as recited in claim 10, wherein said slider bar is moveable with respect to said background grids and wherein said slider bar has at least two dimensions, and wherein at least one of the dimensions of said slider bar are altered dependent on the portion of the complete set of records to be retrieved or displayed.

12. A computer-implemented method as recited in claim 10 wherein said method further comprises;

(c) requesting the determined record range from the database over a network; and (d) receiving records associated with the determined record range from the database.

13. A computer-implemented method as recited in claim 12 wherein the network is the Internet, and the database is hosted by a host computer coupled to the Internet.

14. A computer-implemented method as recited in claim 13, wherein said requesting (c) of the determined record range from the database is performed from a user's machine, and wherein said receiving (d) of the records associated with the determined record range is achieved by the sending of a database view page from the host computer to the user's computer through the Internet.

15. A computer-implemented method as recited in claim 14 wherein the database view page is a HTML page including the records associated with the determined record range from the database.

16. A method for requesting over a network a range of records of a database to be displayed, the database being stored in a first computer coupled to the network, said method comprising:

displaying a record range control on a display screen of a second computer system coupleable to the network, the record range control includes a background grid representing a complete set of records within the database, and a slider bar that slides over the background grid;

dragging the slider bar with respect to the background grid to graphically select those records of the complete set of records to be displayed;

determining a selected record range based on the position and width of the slider bar with respect to the background grid following said dragging; and forming a request for the records within the database stored on the first computer using the selected record range;

wherein said record range includes a record range text box that contains a record range that specifies those records of the complete set of records to be displayed; and wherein said record range can be updated in response to said slider bar sliding over said background grid.

17. A method as recited in claim 16 wherein said method further comprises:

sending the request from the second computer to the first computer via the network to request the records within the database that correspond to the selected record range.

18. A method as recited in claim 16 wherein said forming of the request includes determining a skip amount and a maximum amount based on at least the selected record range.

19. A method as recited in claim 18, wherein said method further comprises:

sending the request from the second computer to the first computer via the network to request the records within the database that are designated by the skip amount and the maximum amount.

20. A method as recited in claim 16, wherein said method further comprises:

adjusting the width of the slider bar to vary the number of records in the selected record range.

21. A method as recited in claim 20, wherein said method further comprises:

receiving the requested records at the second computer from the first computer via the Internet.

22. A method as recited in claim 16, wherein said method further comprises:

sending the request from the second computer to the first computer via the network to request the records within the database that correspond to the selected record range; and receiving the requested records at the second computer from the first computer via the network.

23. A method as recited in claim 22, wherein the network is the Internet.

24. A computer readable medium containing computer program code for displaying a visual indication of a position within a database having records, said computer readable medium comprising:

computer program code that determines a record range within the database to view;

computer program code that displays a record range indicator on a display screen of a computer system, the record range indicator graphically illustrating the relative position of the determined record range with respect to the complete set of records of the database;

computer program code for displaying a record range control on a display screen of a second computer that is coupleable to the network, the record range control includes a background grid representing a complete set of records within the database, and a slider bar having a width, said slider bar capable of sliding over the background grid;

computer program code for displaying a record range text box that contains a record range that specifies those records of the complete set of records to be displayed;

computer program code for dragging the slider bar with respect to the background grid to graphically select those records of the complete set of records to be displayed; and computer program code for updating said record range in response to said slider bar sliding over said background grid.

25. A computer readable medium containing computer code for requesting over a network a range of records of a database, the database being stored in a first computer coupled to the network, computer readable medium comprising:

computer program code for displaying a record range control on a display screen of a second computer that is coupleable to the network, the record range control includes a background grid representing a complete set of records within the database, a slider bar that slides over the background grid, and a record range text box that contains a record range that specifies those records of the complete set of records to be retrieved or displayed;

computer program code for dragging the slider bar with respect to the background grid to graphically select those records of the complete set of records to be displayed;

computer program code for updating a selected record range based on the position of the slider bar with respect to the background grid following said dragging; and computer program code for forming a request for the records within the database stored on the first computer using the selected record range.

* * * * *